3,644,368
NOVEL QUINOLINES

André Allais, Les Lilas, and Jean Meier, Coeuilly-Champigny, France, assignors to Roussel-UCLAF, Paris, France
No Drawing. Filed Dec. 23, 1968, Ser. No. 786,398
Claims priority, application France, Dec. 29, 1967, 134,404; Aug. 23, 1968, 163,980
Int. Cl. C07d 33/52
U.S. Cl. 260—287 R    1 Claim

ABSTRACT OF THE DISCLOSURE

Novel 4 - [ortho-(2',3'-dihydroxypropyloxycarbonyl)-phenyl]-amino-quinolines of the formula

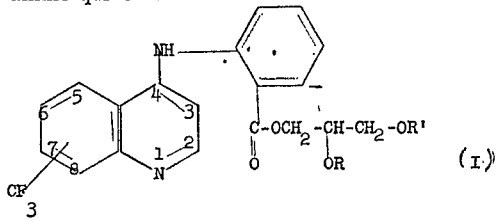

wherein the CF$_3$ radical is in the 7 or 8-position, R and R' are hydrogen and taken together form a ketonide of the formula

P and Q being selected from the group consisting of alkyl aralkyl and aryl and the non-toxic, pharmaceutically acceptable addition salts when R and R' are hydrogen, which possess notable anti-inflammatory activity and intense analgesic activity.

OBJECTS OF THE INVENTION

It is an object of the invention to provide novel 4-[ortho - (2',3' - dihydroxypropyloxycarbonyl) - phenyl]-amino quinolines of Formula I.

It is another object of the invention to provide a novel process for the preparation of the quinolines of Formula I.

It is an additional object of the invention to provide novel analgesic and anti-inflammatory compositions.

It is a further object of the invention to provide a novel method of treating pain and inflammation in warm-blooded animals.

These and other objects and advantages of the invention will become obvious from the following detailed description.

THE INVENTION

The novel 4 - [ortho - (2',3' - dihydroxypropyloxycarbonyl)-phenyl]-amino-quinolines of the invention have the formula

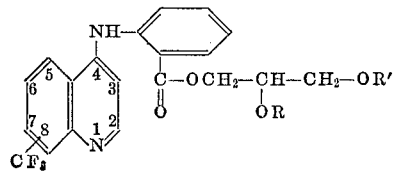

wherein the CF$_3$ radicals is in the 7 or 8-position, R and R' are hydrogen and taken together from a ketonide of the formula

P and Q being selected from the group consisting of alkyl, aralkyl and aryl and the non-toxic, pharmaceutically acceptable acid addition salts when R and R' are hydrogen. P and Q are preferably lower alkyl, phenyl lower alkyl and phenyl.

Examples of suitable non-toxic, pharmaceutically acceptable acids for the formation of the acid addition salts are inorganic acids such as hydrochloric acid, sulfuric acid, nitric acid, etc., and organic acids such as acetic acid, D-tartaric acid, citric acid, maleic acid, nicotinic acid, malic acid, etc.

The process of the invention comprises reacting a 4-(ortho - alkoxycarbonylphenylamino) - 7- or 8-trifluoromethylquinoline with a 2-P-2-Q-4-hydroxymethyl-1,3-dioxolane wherein P and Q have the above definitions to form the ketonide of 4-[ortho-(2',3'-dihydroxypropyloxycarbonyl) - phenyl]-amino-7- or 8-trifluoromethyl-quinoline of Formula I wherein R and R' are

which may then be hydrolyzed under acid conditions to form the corresponding acid salt of 4-[ortho-2',3'-dihydroxylpropyloxycarbonyl) - phenyl] - amino-7- or 8-trifluoromethyl-quinoline which may be converted into the free base by a basic agent treatment.

The alkyl group of the starting 4-phenylaminoquinoline is an alkyl of 1 to 7 carbon atoms and preferably 4-(ortho-methoxycarbonylphenylamino)-7 or 8-trifluoromethylquinoline is used. The said starting materials can be prepared by the process of Belgian Pat. No. 710,321 or French Pat. No. 1,369,967 by condensing an alkyl anthranilate with a 4-chloro-quinoline.

The 2-P-2-Q-4-hydroxymethyl-1,3-dioxolane is one in which P and Q are preferably lower alkyl of 1 to 7 carbon atoms, phenyl lower alkyl and phenyl. The most preferred compound is 2,2 - dimethyl-4-hydroxymethyl-1,3-dioxolane.

The reaction of 2 - P-2-Q-4-hydroxymethyl-1,3-dioxolane with 4-(ortho-alkoxycarbonylphenylamino)-7 (or 8)-trifluoromethyl-quinoline is advantageously effected in the presence of a basic agent such as an alkali metal hydride or amide or an alkali metal, and eliminating from the reaction medium the alkanol formed. The elimination of the alkanol formed can be effected by heating the reaction medium above the alkanol boiling point or by distilling it under reduced presure.

The hydrolysis of the ketonide of the 4-[ortho-(2',3'-dihydroxypropyloxycarbonyl) - phenyl] - amino-7(or 8)-trifluoromethyl-quinoline may be effected in the presence of an acid agent such as hydrochloric acid, sulfuric acid or p-toluenesulphonic acid, and by preferably while eliminating of the free ketone from the reaction medium by distillation.

The basic agent used to decompose the acid addition salt of 4-[ortho-(2',3'-dihydroxypropyloxycarbonylphenyl] - amino - 7 (or 8) - trifluoromethyl-quinoline may be sodium hydroxide, potassium hydroxide, ammonia, triethylamine, sodium bicarbonate, sodium acetate, trisodium phosphate or trisodium citrate. The action of the basic agent on the salt may be effected in water, or in a mixture of water and one or more organic solvents such as dimethylformamide, dioxane, etc. It is not necessary to isolate the acid addition salt. The basic agent can be made to act directly in the reaction medium after hydrolysis of the ketonide, or else after having introduced a solvent or a mixture of suitable solvents into this medium.

The compounds of Formula I, for which R=R'=H, can also be prepared by a variant of the process of the invention which comprises condensing an anthranilate of 2-P-2-Q-4-hydroxymethyl-1,3-dioxolane in the presence of an acid agent with 4-chloro-7 (or 8)-trifluoromethyl-quinoline to obtain 4-[ortho-(2',3'-dihydroxypropyloxycarbonyl) - phenyl] - amino - 7 (or 8)-trifluoromethyl-quinoline. The acid agent in the presence of which one effects the condensation of 4-chloro-7 (or 8)-trifluoromethyl-quinoline and of the anthranilate of 2-P-2-Q-4-hydroxymethyl-1,3-dioxolane is preferably hydrochloric acid or sulfuric acid.

The 4-chloro-7(or 8)-trifluoromethylquinolines may be prepared by processes analogous to A. R. Surrey et al. [Am. Soc. 68,113 (1946)], C. C. Price et al. [Am. Soc. 68, 1204 (1946)], H. Andersag [Ber. 81, 499 (1948)] or French Pat. No. 1,514,280 by condensing the suitably substituted derivatives of aniline with ethyl ethoxalylacetate, ethyl ethoxymethylene malonate, β-propiolactone or acrylic acid, cyclizing the condensation product formed, releasing possible additional carboxyl by saponification, decarboxylating, then replacing the hydroxyl at the 4-position by a chlorine atom, by means of a chlorinating agent, with possible dehydration.

The anthranilate of 2-P-2-Q-4-hydroxymethyl-1,3-dioxolane can be obtained by the method described in French Pat. No. 1,421,229.

The novel anti-inflammatory and analgesic compositions of the invention are comprised of at least one compound of Formula I or the non-toxic pharmaceutically acceptable acid addition salts thereof when R and R' are hydrogen and a major amount of at least one pharmaceutical carrier. A usual daily dosage is 50 mg. to 1 gm. depending upon the mode of administration. The compositions may be in the form of injectable solutions or suspensions in ampoules or multidose flacons or in the form of tablets, coated tablets, capsules, syrups, suppositories and ointments.

Due to the notable anti-inflammatory and intense analgesic activity of the compositions, they can be used for the treatment of all the muscular, articular or nervous algias, rheumatic affections, dental distress, zona, migraines and as supplementary treatment of febrile and infectious states. 4-[ortho-(2',3'-dihydroxypropyloxycarbonyl) - phenyl] - amino - 7 - trifluoromethyl - quinoline and its acetonide and 4-[ortho-(2',3'-dihydroxypropyloxycarbonyl)-phenyl]-amino-8-trifluoromethyl-quinoline and its acetonide are preferred compounds.

The novel method of the invention for treating pain and inflammatory conditions in warm-blooded animals comprises administering to warm-blooded animals a safe and effective amount of at least one compound of Formula I or the non-toxic, pharmaceutically acceptable acid addition salts thereof when R and R' are hydrogen. The said products may be administered orally, perlingually, rectally, transcutaneously or topically on skin and mucosa. The usual useful dose is 0.5 to 4 mg./kg. depending upon the method of administration.

In the following examples there are described several preferred embodiments to illustrate the invention. However, it should be understood that the invention is not intended to be limited to the specific embodiments.

EXAMPLE I

Preparation of 4 - [ortho - (2',3' - dihydroxypropyloxycarbonyl) - phenyl] - amino - 7 - trifluoromethylquinoline acetonide 40 cc. of 2,2-dimethyl-4-hydroxymethyl-1,3-dioxolane and 40 cc. of toluene were admixed and the solution was dehydrated by azeotropic distillation. The internal temperature was returned to 85° C. and then 250 mg. of an oily suspension of 50% sodium hydride were added thereto followed by addition of 9.9 g. of 4-(ortho-methoxycarbonyl-phenylamino) - 7 - trifluoromethylquinoline (described in French Pat. No. 1,369,967). The mixture was agitated under a reduced pressure of 50 to 100 mm. of mercury and heated for five hours at 85° C. After cooling to ambient temperature, 100 cc. of water, 5 cc. of saturated aqueous solution of sodium chloride and 50 cc. of methylene chloride were added thereto. The mixture was agitated and the organic phase was decanted. The aqueous phase was extracted with methylene chloride. The extracts were combined with the principal methylene chloride phase and washed with water, dried over anhydrous sodium sulphate, filtered and distilled to dryness in vacuo to obtain 12.5 g. of crude product (theory: 12.79 g.). The residue was dissolved at reflux in 40 cc. of isopropyl ether and the solution was filtered while hot and concentrated to 15 cc. Crystallization was started by cooling and after ice-cooling for one hour, the mixture was filtered. The precipitate was pasted with ice-cooled isopropyl ether and dried in vacuo to obtain 9.53 g. (68.5% yield) of 4-[ortho - (2',3' - dihydroxypropyloxycarbonyl) - phenyl]-amino-7-trifluoromethylquinoline acetonide having a melting point of 103°–104° C. Another crystallization from hot and cold isopropyl ether provided a pure product melting at 107° C.

The product appeared in the form of colorless prisms, soluble in the majority of the usual organic solvents and insoluble in water.

Analysis: $C_{23}H_{21}F_3N_2O_4$; molecular weight=446.42
Calculated: C% 61.88, H% 4.74, F% 12.77, N% 6.28
Found: C% 62.0, H% 4.8, F% 12.5, N% 6.3

As far as is known, this compound is not described in the literature.

EXAMPLE II

Preparation of 4-[ortho-(2',3'-dihydroxypropyloxycarbonyl)-phenyl]-amino-7-trifluoromethylquinoline 5.17 g. of 4-[ortho-(2',3-dihydroxypropyloxycarbonyl)-phenyl]-amino-7-trifluoro-methylquinoline acetonide (obtained in Example I) were suspended in 15 cc. of water under an inert atmosphere and the mixture was heated to 95° C. with agitation. 3 cc. of concentrated hydrochloric acid were added thereto and the mixture was agitated for 15 minutes at 92°–95° C. After ice cooling for one hour the crystals were separated and suction-filtered, pasted with ice-cooled water and dried in vacuo to obtain 4.93 g. of 4-[ortho-(2',3'-dihydroxypropyloxycarbonyl)-phenyl]-amino-7-trifluoromethylquinoline hydrochloride in the form of yellow crystals, melting at 140°–150° C. The crude hydrochloride was dissolved in 15 cc. of dimethylformamide by heating on a boiling water-bath and first 10 cc. of water and then 2 cc. of triethylamine were added thereto with agitation. After ice-cooling for one hour, the mixture was filtered. The precipitate was washed with water and dried in vacuo to obtain 4.29 g. of a product melting at 175° C. Upon recrystallization from ethanol, a first yield of 3.11 g. (66% yield) of 4-ortho-(2',3'-dihydroxypropyloxycarbonyl) - phenyl]-amino - 7-trifluoromethylquinoline with an unchanged melting point was obtained.

The product appeared in the form of colorless needles, soluble in alcohol, slightly soluble in ether and benzene and insoluble in water.

Analysis: $C_{20}H_{27}F_3N_2O_4$; molecular weight=406.36
Calculated: C% 59.11, H% 4.22, F% 14.03, N% 6.89
Found: C% 58.8, H% 4.6, F% 13.6, N% 6.6

As far as is known, this compound is not described in the literature.

EXAMPLE III

Preparation of 4-[ortho-(2',3' - dihydroxypropyloxycarbonyl)-phenyl]-amino - 8 - trifluoromethylquinoline acetonide Step A: Ortho-trifluoromethylanilinomethylene ethyl malonate.—A mixture of 54.8 g. of ortho-trifluoromethylaniline and 73.5 g. of ethoxymethylene ethyl malonate was heated to 120° C. under an inert atmosphere and maintained for one hour at this temperature while distilling off the ethanol formed. The mixture was cooled and the elimination of ethanol was completed by distillation under reduced pressure. The mixture was cooled to obtain 115 g. of ortho-trifluoromethyl-anilinomethylene ethyl malonate which was used as is for the following stage. A sample of the product was crystallized from petroleum ether (B.P.=65°–75° C.) to obtain a melting point of 94° C.

Analysis: $C_{15}H_{16}F_3NO_4$; molecular weight=331.288
Calculated: C% 54.38, H% 4.87, F% 17.21, N% 4.23
Found: C% 54.5, H% 4.7, F% 16.8, N% 4.5

As as far is known, this compound is not described in the literature.

Step B: 3-carbethoxy-4-hydroxy-8-trifluoromethylquinoline.—A mixture of 113 g. of crude ortho-trifluoromethylanilino methylene ethyl malonate from Stage A, and 115 cc. of phenyl oxide was heated rapidly under an inert atmosphere. At about 195° C., the ethanol formed began to distill off. At the end of about 30 minutes, the interior temperature reached 250° C. and the reaction mixture was heated to reflux. Reflux was maintained for one hour and the mixture was then cooled. 25 cc. of acetone were added and the mixture was allowed to crystallize. The mixture was filtered and the crystals thus formed were washed and dried to obtain 71.5 g. of 3-carbethoxy-4-hydroxy-8-trifluoromethylquinoline with a melting point of 210°–214° C., which was used as is for the following stage. A sample of this product was crystallized from ethanol to show a melting point of 216° C.

Analysis: $C_{13}H_{10}F_3NO_3$; molecular weight=285.218
Calculated: C% 54.74, H% 3.53, F% 19.98, N% 4.91
Found: C% 54.5, H% 3.8, F% 19.6, N% 4.9

As far as is known, this compound is not described in the literature.

Step C: 3-carboxy-4-hydroxy-8-trifluoromethylquinoline.—70 g. of crude 3-carbethoxy-4-hydroxy-8-trifluoromethylquinoline, obtained in stage B, were introduced under an inert atmosphere into a mixture of 300 cc. of water and 100 cc. of aqueous 10 N solution of sodium hydroxide. The reaction mixture was heated to reflux and maintained there for two hours and forty-five minutes. The solution obtained was poured over a mixture of water, ice and 100 cc. of aqueous 11.8 N solution of hydrochloric acid. The precipitate thus formed was isolated by filtration, washed with water and introduced into a solution of 20 g. of sodium bicarbonate in 2 liters of water. The mixture was heated to 90° C. and filtered to remove slight persisting insolubles. The filtrate was acidified with acetic acid to bring the pH to about 5.5 and the precipitate formed, was isolated by filtration, washed and dried to obtain 58 g. of 3-carboxy-4-hydoxy-8-trifluoromethylquinoline having a melting point of 290°–292° C., which was used as is for the following stage. A sample of the product was crystallized from hot and cold acetone, treated with charcoal to obtain pure 3-carboxy-4-hydroxy-8-trifluoromethylquinoline having a melting point of 292° C.

Analysis: $C_{11}H_6F_3NO_3$; molecular weight=257.166
Calculated: C% 51.37, H% 2.35, F% 22.16, N% 5.54
Found: C% 51.6, H% 2.6, F% 21.8, N% 5.3

As far as is known, this compound is not described in the literature.

Step D: 4-hydroxy-8-trifluoromethylquinoline.—Under an inert atmosphere, 56.5 g. of crude 3-carboxy-4-hydroxy-8-trifluoromethylquinoline, obtained in Stage C were introduced into 110 cc. of phenyl oxide. The reaction mixture was rapidly heated to reflux and maintained at reflux for an hour and fifteen minutes. The reaction mixture was cooled to about 50° C. and 20 cc. of isopropyl ether were added thereto. The mixture was cooled to 20° C. and allowed to crystallize. The precipitate formed was isolated by filtration, washed, and dried to obtain 45.8 g. of 4-hydroxy-8-trifluoromethylquinoline having a melting point of 180° C. A sample of this product was crystallized from acetone, treated with charcoal to obtain pure 4-hydroxy-8-trifluoromethylquinoline having a melting point of 180° C.

Analysis: $C_{10}H_6F_3NO$; molecular weight=213.156.
Calculated: C% 56.34, H% 2.84, F% 26.74, N% 6.57.
Found: C% 56.6, H% 3.1, F% 26.5, N% 6.5.

As far as is known, this compound is not described in the literature.

Step E: 4-chloro-8-trifluoromethylquinoline.—44.3 g. of crude 4-hydroxy-8-trifluoromethyl-quinoline obtained in Step D were introduced in small amounts into 130 cc. of phosphorus oxychloride and then the reaction mixture was held for 15 minutes at ambient temperature and heated to reflux and maintained at reflux for one hour. The mixture was cooled and excess phosphorus oxychloride was removed by distillation under reduced pressure. Water, ice, and then 80 cc. of aqueous solution of ammonia at 22° Bé. were added to the residue and the mixture was stirred and the aqueous phase was extracted with ether. The ethereal extracts were washed with a dilute aqueous solution of ammonia, then with water, dried, treated with charcoal and concentrated to dryness to obtain 45.4 g. of 4-chloro-8-trifluoro-methylquinoline having a melting point of 78° C., which was used as is for the preparation of 4-(otho-methoxycarbonylphenylamino) - 8-trifluoromethylquinoline. A sample of crude 4-chloro-8-trifluoromethylquinoline was crystallized from petroleum ether (B.P.= 65°–75° C.) to get a product with a melting point of 78° C.

Analysis: $C_{10}H_5F_3ClN$; molecular weight 231.605.
Calculated: C% 51.86, H% 2.18, F% 24.61, Cl% 15.3, N% 6.05.
Found: C% 52.2, H% 2.3, F% 24.9, Cl% 15.5, N% 5.8.

As far as is known, this compound is not described in the literature.

Step F: 4-(ortho-methoxycarbonyl)-phenylamino-8-trifluoromethylquinoline.—Into 100 cc. of aqueous 2 N solution of hydrochloric acid, 23.15 g. of crude 4-chloro-8-trifluoromethylquinoline, obtained in Step E, then 15.85 g. of methyl anthranilate were introduced. The reaction mixture was heated to reflux and maintained there for fifty minutes. The mixture was cooled and the crystallation developed. The precipitate formed was recovered by filtration and introduced into 300 cc. of a saturated aqueous solution of sodium bicarbonate. The mixture was agitated, methylene chloride was added and the mixture agitated and filtered to remove persisting insolubles. The organic phase was separated by decantation, washed with water and concentrated to dryness. The residue was crystallized from methanol to obtain 21.3 g. of 4-(ortho-methoxy-carbonylphenylamino)-8-trifluoromethyl-quinoline with a melting point of 176° C.

Analysis: $C_{18}H_{13}F_3N_2O_2$; molecular weight=346.30.
Calculated: C% 62.43, H% 3.78, F% 16.46, N% 8.09.
Found: C% 62.2, H% 4.0, F% 16.3, N% 8.0.

I.R. spectrum (chloroform):
Absorption at 3297 and 3264 cm.$^{-1}$ corresponding to —N—H grouping.
Absorption at 1691 cm.$^{-1}$ corresponding to carbonyl.
Absorption at 1142 cm.$^{-1}$ and 1147 cm.$^{-1}$ corresponding to $CF_3$ grouping.

As far as is known, this compound is not described in the literature.

Step G: 4-[ortho-(2′,3′-dihydroxypropyloxycarbonyl)-phenyl]-amino-8-trifluoromethylquinoline acetonide.—100 cc. of toluene were added to 80 cc. of 2,2-dimethyl-4-hydroxymethyl-1,3-dioxolane and the toluene was distilled off under reduced pressure to eliminate the water present. To the anhydrous 2,2-dimethyl-4-hydroxymethyl-1,3-dioxolane thus obtained, 0.25 g. of an oily 50% suspension of sodium hydride and then 21.3 g. of 4-(ortho-methoxycarbonylphenylamino) - 8-trifluoromethylquinoline were added under inert atmosphere. The mixture was agitated for five hours at 85° C. under a vacuum of 50 to 100 mm. of mercury. After cooling an aqueous solution of sodium chloride was added to the reaction mixture and it was stirred. The aqueous phase was extracted with methylene chloride and the methylene chloride extracts were washed with water, dried and concentrated to dryness by distillation under reduced pressure. The residue was washed with petroleum ether (B.P. 65°–75° C.), dried and crystallized from isopropyl ether to obtain 23.8 g. of 4-[ortho-(2′,3′-dihydroxypropyloxycarbonyl)-phenyl] - amino - 8-trifluoromethylquinoline acetonide having a melting point of 108° C. The product appeared in the form of colorless crystals, soluble in alcohol, chloroform, acetone and methylene chloride, slightly soluble in isopropyl ether and insoluble in water.

Analysis: $C_{23}H_{21}F_3N_2O_4$; molecular weight=446.42.
Calculated: C% 61.88, H% 4.74, F% 12.77, N% 6.28.
Found: C% 61.9, H% 4.8, F% 12.9, N% 6.4.

As far as is known, this compound is not described in the literature.

EXAMPLE IV

Preparation of 4 - [ortho-(2′,3′-dihydroxypropyloxycarbonyl)-phenyl]-amino-8-trifluoromethylquinoline Into a mixture of 60 cc. of water and 12 cc. of aqueous solution of 22° Bé. hydrochloric acid there was introduced 19.8 g. of 4-[ortho-(2′,3′-dihydroxypropyloxy-carbonyl)-phenyl]-amino-8-trifluoromethylquinoline acetonide (obtained in Example III) and the temperature of the reaction mixture was raised to 95° C. and maintained at this temperature for 15 minutes. The mixture was cooled to 0° C. and crystallization was allowed. The crude hydrochloride was recovered by filtration, washed and introduced into a mixture of 60 cc. of dimethylformamide, 40 cc. of water and 10 cc. of triethylamine. Dissolution and the crystallization occurred and the precipitate was recovered by filtration and was washed and dried to obtain 16 g. of crude base having a melting point of 179°–180° C. The crude base was crystallized from methanol with treatment with charcoal to obtain 11.95 g. of 4-[ortho-(2′,3′-dihydroxypropyloxycarbonyl)-phenyl]-amino-8-trifluoromethylquinoline with a melting point of 179°–180° C. The crude base was crystallized from methanol with treatment with charcoal to obtain 11.95 g. of 4-[ortho-(2′,3′-dihydroxypropylcarbonyl)-phenyl] - amino-8-trifluoromethylquinoline with a melting point of 179°–180° C.

The compound appeared in the form of a solid product, colorless, soluble in alcohol and acetone, very slightly soluble in ether, chloroform and methylene chloride and insoluble in water.

Analysis: $C_{20}H_{17}F_3N_2O_4$; molecular weight=406.36
Calculated: C% 59.11, H% 4.22, F% 14.03, N% 6.89
Found: C% 58,9, H% 4.3, F% 13.8, N% 7.0

EXAMPLE V

Preparation of 4 - [ortho-(2′,3′,-dihydroxypropyloxycarbonyl)-phenyl]-amino-8-trifluoromethylquinoline A mixture of 48 g. of 2,2-dimethyl-4- hydroxymethyl-1,3-dioxolane anthranilate (described in French Pat. No. 1,421,229), 42 g. of 4 - chloro - 8 - trifluoromethyl-quinoline (described in Example III), 36 cc. of concentrated hydrochloric acid and 300 cc. of water was agitated while heating at reflux for forty-five minutes.

The mixture was filtered and the filtrate stood at 0° C. for three hours, then filtered. The hydrochloride precipitate was washed, then introduced into a mixture of 240 cc. of dimethylformamide, 160 cc. of water and 40 cc. of triethylamine. The precipitate was recovered by filtration, was washed and dried to obtain 45 g. of 4-[ortho-(2′,3′-dihydroxypropyloxycarbonyl) - phenyl] - amino-8-trifluoromethylquinoline having a melting point of 179°–180° C. and identical to the product described in Example IV.

Operating in the same way, but starting from 4-chloro-7-trifluoromethylquinoline, 4 - [ortho - (2′,3′-dihydroxypropyloxycarbonyl)-phenyl]-amino - 7 - trifluoromethyl-quinoline identical to the product described in Example II was obtained.

PHARMACOLOGICAL DATA (A) Anti-inflammatory activity

The anti-inflammatory activity of the following compounds was determined by the method of Branceni et. al., slightly modified (Arch. Int. Pharmacodyn, vol. 152, 1964, p. 15). The test used consisted in administering in a single injection 500γ of naphtoylheparamine under the aponevrosis of the sole of a hind paw of rats weighing 150 gm. (This injection being destined to provoke the formation of an inflammatory edema). The products to be studied were administered in aqueous suspension by oral route one hour before the injection. The amount of inflammation was determined by plethysmometry, the volume of the paw being measured immediately prior and 2 hours after the irritating injection. The volumes at the hour $H_2$ were adjusted to their initial level, by the analysis of covariance. The degree of inflammation is calculated as a percentage of that of the control animals. The results are summarized in Table I.

Compound A—4 - [ortho - (2′,3′-dihydroxypropyloxycarbonyl) - phenyl]-amino-8-trifluoromethyl-quinoline
Compound B—The acetonide of Compound A
Compound C—4 - [ortho - (2′,3′-dihydroxypropyloxycarbonyl) - phenyl]-amino-7-trifluoromethyl-quinoline
Compound D—The acetonide of Compound C.

TABLE 1

| Dose administered in mg./kg. | Degree of inflammation in percent with reference to controls— | | | |
|---|---|---|---|---|
| | A | B | C | D |
| 5 | | | 76 | 89 |
| 15 | 58 | | 56 | 39 |
| 30 | | | 37 | 27 |
| 45 | 28 | | | |
| 90 | | 26 | | |

The results of Table I show that compound A has an anti-inflammatory $ED_{50}$ of about 20 mg./kg. and compound B has an $ED_{50}$ of less than 30 mg./kg. The $ED_{50}$ of compounds C and D are somewhere between 10 and 15 mg./kg. as compared to aspirin which under similar test conditions has an $ED_{50}$ of 200 mg./kg.

(B) Analgesic activity

The test employed was based on the fact noted by Koster et al. (Fed. Proc. 1959, 18, 412) according to which the introperitoneal injection of acetic acid provoked repeated characteristic movements of stretching and twisting persisting in mice for more than six hours. Analgesics prevent or suppress this syndrome which is an exterior manifestation or a diffuse abdominal pain.

A solution of 6 parts per thousand of acetic acid in water containing 10% of arabic gum was employed and the dose releasing the syndrome in mice under these conditions was 0.01 cc./gm., being 60 mg./kg. of acetic acid. The analgesics were administered orally to groups of five mice, which had not been fed for 24 hours, a half hour before the intra-peritoneal injection of the acetic acid. The stretchings were observed, noted and counted for each mouse and then additionally by groups of five, during a period of observation of fifteen minutes immediately after the injection of acetic acid.

The products of the invention which were administered in the form of an aqueous suspension diminished the number of stretchings in a fashion obviously proportional to the doses utilized.

Products A and B were administered at dosages of 10, 20, 50 and 100 mg./kg. and product C was administered at 5, 10, 20, 50 and 100 mg./kg. while product D was administered at 20, 50, 100 and 200 mg./kg. to determine the ED thereof. Products A and C had an $ED_{50}$ of about 10 mg./kg.; product B had an $ED_{50}$ of about 20 mg./kg. and product D had an $ED_{50}$ of about 35 mg./kg. compared to the $ED_{50}$ of aspirin of 160 mg./kg.

Various modifications of the compositions and method of the invention may be made without departing from the spirit or scope thereof.

We claim:
1. 4-[ortho-(2',3'-dihydroxypropyloxycarbonyl) - phenyl]-amino-8-trifluoromethyl quinoline.

References Cited

UNITED STATES PATENTS

| | | | |
|---|---|---|---|
| 3,174,972 | 3/1965 | Allais et al. | 260—287 |
| 3,232,944 | 1/1966 | Allais et al. | 260—286 |
| 3,502,680 | 3/1970 | Allais et al. | 260—287 |
| 3,502,682 | 3/1970 | Allais et al. | 260—287 |

DONALD G. DAUS, Primary Examiner

U.S. Cl. X.R.

260—286.2, 340.9; 424—258